US010933978B2

(12) United States Patent
Olson et al.

(10) Patent No.: US 10,933,978 B2
(45) Date of Patent: Mar. 2, 2021

(54) MOVING END ELECTRONIC DETECTION OF SECONDARY LOAD PATH ENGAGEMENT OF AIRCRAFT FLIGHT CONTROL ACTUATOR

(71) Applicant: Parker-Hannifin Corporation, Cleveland, OH (US)

(72) Inventors: Derek James Olson, Ogden, UT (US); Abbas M. Charafeddine, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 290 days.

(21) Appl. No.: 15/728,539

(22) Filed: Oct. 10, 2017

(65) Prior Publication Data
US 2018/0194454 A1   Jul. 12, 2018

Related U.S. Application Data

(60) Provisional application No. 62/444,486, filed on Jan. 10, 2017.

(51) Int. Cl.
*B64C 13/28* (2006.01)
*B64C 5/02* (2006.01)
(Continued)

(52) U.S. Cl.
CPC ............... *B64C 13/28* (2013.01); *B64C 5/02* (2013.01); *B64C 5/10* (2013.01); *B64C 13/341* (2018.01); *B64C 9/14* (2013.01); *B64C 2009/005* (2013.01)

(58) Field of Classification Search
CPC .. B64C 13/28; B64C 5/10; B64C 9/14; B64C 2009/005; B64C 13/341; B64C 9/02; B64C 13/32; F16H 25/205; F16H 25/2472
See application file for complete search history.

(56) References Cited

U.S. PATENT DOCUMENTS 2,701,478 A   2/1955   Hanley
2,959,982 A   12/1957   Cadwallader
(Continued)

FOREIGN PATENT DOCUMENTS

DE   4439436   5/1995
EP   1363178   11/2003
WO   2008155170   12/2008

OTHER PUBLICATIONS

Edward Balaban et al.; Airborne Electro-Mechanical Actuator Test Stand for Development of Prognostic Health Management Systems; Annual Conference of the Prognostics and Health Management Society, 2010.

(Continued)

*Primary Examiner* — Medhat Badawi
*Assistant Examiner* — Vicente Rodriguez
(74) *Attorney, Agent, or Firm* — Renner, Otto, Boisselle & Sklar, LLP

(57) ABSTRACT

A linear actuator, for controlling movement of a control surface of an aircraft, includes a screw, a primary load path and secondary nut engaged with the screw, and an engagement member. The engagement member moves from an ambush position, maintained by the primary load path or the secondary nut, to an engaged position, restricting relative movement between the primary load path and the secondary nut. The restricted relative movement may occur in response to free relative axial movement of the primary load path and the secondary nut caused by a failure of the primary load path of the linear actuator. A sensor of the linear actuator is configured to sense the failure of the primary load path and the free relative axial movement of the primary load path and the secondary nut.

20 Claims, 7 Drawing Sheets

(51) Int. Cl.
  *B64C 5/10* (2006.01)
  *B64C 9/00* (2006.01)
  *B64C 9/14* (2006.01)

(56) References Cited

U.S. PATENT DOCUMENTS

| | | | |
|---|---|---|---|
| 2,875,631 | A | 3/1959 | Syring |
| 3,421,719 | A | 1/1969 | Ask |
| 3,995,800 | A | 12/1976 | Swogger |
| 4,256,277 | A | 3/1981 | Embree |
| 4,431,093 | A | 2/1984 | Yang |
| 4,569,243 | A | 2/1986 | Chapman et al. |
| 4,841,209 | A | 6/1989 | Poumakis |
| 5,613,929 | A | 3/1997 | Bayer |
| 5,719,566 | A | 2/1998 | Readman et al. |
| 6,467,363 | B2 * | 10/2002 | Manzanares ........ F16H 25/2454 74/89.39 |
| 6,672,540 | B1 | 1/2004 | Shaheen et al. |
| 6,739,550 | B2 | 5/2004 | Koizumi et al. |
| 6,851,648 | B2 * | 2/2005 | Perni ................. F16H 25/205 244/99.3 |
| 7,293,524 | B2 | 11/2007 | Darby |
| 7,299,702 | B2 | 11/2007 | Gibert |
| 7,299,703 | B2 | 11/2007 | Balasu et al. |
| 7,366,590 | B2 | 4/2008 | Balasu |
| 7,410,132 | B1 | 8/2008 | Flatt |
| 7,556,224 | B2 | 7/2009 | Johnson et al. |
| 7,610,828 | B2 | 11/2009 | Wingett et al. |
| 7,680,565 | B2 | 3/2010 | Balasu et al. |
| 7,789,345 | B2 | 9/2010 | Matsui et al. |
| 7,852,183 | B2 | 12/2010 | Potter et al. |
| 7,866,602 | B2 | 1/2011 | Port-Robach et al. |
| 7,946,529 | B2 | 3/2011 | Moalic et al. |
| 7,930,949 | B2 | 4/2011 | Singh |
| 8,033,500 | B1 | 10/2011 | Charadeffine et al. |
| 8,146,858 | B2 * | 4/2012 | Port-Robach ...... F16D 41/12 244/99.9 |
| 8,191,824 | B2 | 6/2012 | Shaheen et al. |
| 8,291,782 | B1 | 10/2012 | Shaheen et al. |
| 8,496,204 | B1 | 7/2013 | Charafeddine et al. |
| 8,656,797 | B2 | 2/2014 | Bassett |
| 8,714,479 | B1 | 5/2014 | Chapman |
| 8,985,510 | B2 | 3/2015 | Hale |
| 10,065,728 | B2 * | 9/2018 | Cyrot ................. B64C 13/343 |
| 10,161,491 | B1 * | 12/2018 | Doman ............. F16H 25/2454 |
| 2007/0051847 | A1 | 3/2007 | Quitmeyer et al. |
| 2007/0108342 | A1 | 5/2007 | Hanlon et al. |
| 2007/0220998 | A1 | 9/2007 | Kopecek |
| 2008/0203223 | A1 | 8/2008 | Cyrot et al. |
| 2010/0116929 | A1 | 5/2010 | Hejda |
| 2010/0125380 | A1 | 5/2010 | Brüeckner et al. |
| 2010/0162837 | A1 | 7/2010 | Cavalier et al. |
| 2010/0250047 | A1 | 9/2010 | Balasu et al. |
| 2010/0264263 | A1 | 10/2010 | Shaheen et al. |
| 2011/0048147 | A1 | 3/2011 | Keech |
| 2011/0068221 | A1 | 3/2011 | Recksiek et al. |
| 2011/0000287 | A1 | 6/2011 | Bacic |
| 2012/0018578 | A1 | 1/2012 | Polcuch |
| 2012/0025014 | A1 | 2/2012 | Duyck et al. |
| 2013/0001357 | A1 | 1/2013 | Cyrot |
| 2013/0105623 | A1 | 5/2013 | Moulon et al. |
| 2013/0116863 | A1 | 5/2013 | Goupil et al. |
| 2013/0313358 | A1 | 11/2013 | Hale |
| 2014/0190291 | A1 * | 7/2014 | Medina ............. F16H 25/205 74/89.23 |
| 2015/0267793 | A1 | 9/2015 | Bernard |
| 2016/0340026 | A1 * | 11/2016 | Antunes ............ F16H 25/2472 |

OTHER PUBLICATIONS

Stephen C. Jensen et al.; Flight Test Experience With an Electromechanical Actuator on the F-18 Systems Research Aircraft; Presented at the 19th Digital Avionics Systems Conference, Oct. 7-13, 2000, Philadelphia, Pennsylvania. G. Jenney and B. Raymond, Dynamic Controls, Inc., Dayton, Ohio; D. Dawson, Wright Laboratory, WPAFB, Ohio.

Edward Balaban et al.; Experimental Validation of a Prognostic Health Management System for Electro-Mechanical Actuators; American Institute of Aeronautics and Astronautics.

Nils Wachendorf et al.; Multivariable Controller Design for a Trimmable Horizontal Stabilizer Actuator With Two Primary Load Paths; 26th International Congress of the Aeronautical Sciences.

Schaeffler KG, Detent Pins for Automotive Transmissions, Product Information, 2007, 30 pages, Schaeffler KG, Germany.

* cited by examiner

MOVING END ELECTRONIC DETECTION OF SECONDARY LOAD PATH ENGAGEMENT OF AIRCRAFT FLIGHT CONTROL ACTUATOR

RELATED APPLICATIONS

This application claims the benefit of U.S. Provisional Application No. 62/444,486 filed Jan. 10, 2017, which is hereby incorporated herein by reference in its entirety.

FIELD OF INVENTION

The present invention relates generally to aircraft flight control actuators, and more particularly to aircraft flight control actuators having assemblies for restricting and detecting movement of a flight control surface in the case of an actuator failure.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw and roll axes, and the secondary flight control surfaces are those that are used to influence the lift or drag (or both) of the aircraft. Although some aircraft may include additional control surfaces, the primary flight control surfaces typically include a pair of elevators, a pair of ailerons and a rudder, and the secondary flight control surfaces typically include a horizontal stabilizer, a plurality of flaps, slats and spoilers.

Modern aircraft have horizontal stabilizers located at the tail section of the fuselage or the rudder section that are pivotally supported relative to the airplane fuselage to "trim" the aircraft during flight by selective adjustment by the operator or pilot from an internal control unit. This involves adjusting the position of the horizontal stabilizer by a stabilizer actuator to accommodate different load distributions within the aircraft and different atmospheric conditions, i.e. wind, rain, snow, etc. In this regard the stabilizer is traditionally pivotally connected to the tail section of the fuselage at a point generally midway along its length.

One common trimmable horizontal stabilizer actuator consists of a primary ball nut connected with an actuating drive gimbal which is pivotally connected to an actuating end of the horizontal stabilizer structure. The primary ball nut includes a primary ball nut threaded member and a primary drive gimbal. A rotatable ball screw extends axially and usually vertically through the primary ball nut threaded member and the drive gimbal. The primary ball nut is connected to the stabilizer by trunnion segments of the primary drive gimbal. The ball screw, in turn, may have a remote end opposite the driving end, where the remote end is remote from the actuating drive gimbal and may be fixed from translation or axial movement. For example, the remote end may be connected to a second, support gimbal which is pivotally secured to the aircraft, such as to the tail section.

As the ball screw is rotated, the primary drive gimbal and primary ball nut will be moved in translation. Thus, as the ball screw is rotated in one direction, the primary ball nut is moved towards the ball screw distal end and the leading edge of the horizontal stabilizer is pivoted in a first direction, such as upward. On the other hand, by rotating the ball screw in an opposite direction, the primary ball nut is moved toward the ball screw proximal end and the leading edge of the horizontal stabilizer is pivoted in a second direction, such as downward. Rotation of the ball screw is routinely effected by a motor and associated gearing which is actuated by the pilot via the internal control unit.

The horizontal stabilizer movement, as controlled by the operator, is transmitted by the ball screw through the actuating primary drive gimbal by way of the primary ball nut which together define a primary load path. The movement has a load with tensile and compressive components as well as a torque component due to the ball screw thread lead. Failures of the primary load path, such as caused by the shearing off of a connecting trunnion segment of the primary drive gimbal, or by the loss of nut ball members from the primary ball nut, can result in the partial or complete loss of control of the horizontal stabilizer. For this reason, stabilizer actuators are often provided with a secondary load path as a protection against such catastrophic failure of the primary load path.

SUMMARY OF INVENTION

The present invention provides a linear actuator for moving a control surface, such as of an aircraft, the linear actuator having cooperating primary and secondary load paths each extending between a screw of the linear actuator and the control surface, where the secondary load path transitions to a controlling state taking majority control of the control surface from the primary load path in response to a failure of the primary load path. A sensor of the linear actuator is configured to sense both the failure of the primary load path and the transitioning of the secondary load path.

The present invention also provides a linear actuator having a screw, a primary load path including a primary nut engaged with the screw, a secondary nut engaged with the screw, and an engagement member. The engagement member moves from an ambush position maintained by the primary load path or the secondary nut to an engaged position restricting relative movement between the primary load path and the secondary nut, in response to relative axial movement of the primary load path and the secondary nut that is caused by a failure of the primary load path of the linear actuator.

According to a first aspect, a linear actuator for controlling movement of an external surface includes a screw, a primary load path engaged between the screw and the external surface, the primary load path having a primary nut engaged with the screw, a secondary nut engaged with the screw, and an engagement member that is maintained by one or both of the primary load path or the secondary nut in an ambush position until relative axial movement of the primary load path and the secondary nut exceeds a predetermined amount, after which the engagement member is free to move from the ambush position to an engaged position restricting relative movement between the primary load path and the secondary nut.

The engagement member may be carried by the secondary nut for axial common movement therewith.

The linear actuator may further include a biasing member that biases the engagement member towards the engaged position.

The biasing member may extend between the engagement member and the secondary nut.

The engagement member may be maintained in the ambush position via the relative positioning of the secondary nut relative to the primary load path.

The engagement member may be maintained in the ambush position via axial alignment of each of the primary load path and the secondary nut relative to one another and to the screw.

The engagement member may be biased radially inwardly towards a central rotational axis of the screw to the engaged position.

The secondary nut may be anti-rotated relative to the screw via contact with a secondary nut housing disposed about the secondary nut and axially fixed relative to the primary load path.

The primary nut may be anti-rotated relative to the screw via coupling to the external surface.

The linear actuator may further include a sensor for sensing movement of the engagement member from the ambush position to the engaged position.

The sensor may be carried for common axial movement with the primary load path.

The sensor may be fixed relative to the secondary nut upon movement of the engagement member to the engaged position.

The linear actuator may be provided in combination with an aircraft having the external surface, where the secondary nut is coupled to the external surface for controlling the external surface when the engagement member is in the engaged position.

According to a second aspect, a linear actuator, for controlling a control surface, includes a screw, a primary load path extendable between the screw and the control surface, and a secondary load path extendable between the screw and the control surface. The secondary load path transitions from a default non-controlling state having less than majority control of the control surface to a secondary controlling state to take majority control of the control surface in response to the primary load path transitioning from a default operative state having majority control of the control surface to a failure state having less then majority control of the control surface.

The primary load path may transfer a greater load between the screw and the control surface than the secondary load path when the primary load path is in the default operative state, and the secondary load path may transfer a greater load between the screw and the control surface than the primary load path when the secondary load path is in the secondary controlling state.

The linear actuator may further include a sensor configured to sense both the transition of the primary load path from the default operative state to the failure state, and the transition of the secondary load path from the default non-controlling state to the secondary controlling state.

The secondary load path may include a secondary nut threadedly engaged with the screw, and the primary load path includes a primary nut threadedly engaged to the screw, and the secondary nut may be configured to transfer a lesser force from the screw to the control surface than the primary nut until the primary load path is transitioned to the failure state.

The secondary load path may be biased in the non-controlling state until relative axial movement of the primary load path and the secondary nut exceeds a predetermined amount.

The secondary load path may further include an engagement member coupled to the secondary nut for translation with the secondary nut, the engagement member being configured to move from a default disengaged position to a biased engaged position in response to the primary load path transitioning to the failure state, and the movement of the engagement member to the biased engaged position enabling the secondary load path to transition to the secondary controlling state.

The linear actuator may be provided in combination with an aircraft having the control surface, where the primary load path provides majority control of the control surface when the secondary load path is in the default non-controlling state.

The foregoing and other features of the invention are hereinafter described in greater detail with reference to the accompanying drawings.

BRIEF DESCRIPTION OF THE DRAWINGS

The annexed drawings, which are not necessarily to scale, show various aspects of the disclosure.

DETAILED DESCRIPTION

The principles of the present invention have particular application to flight control actuators for controlling a flight control surface of a vehicle, such as a stabilizer of an aircraft. The principles are also applicable to other actuators including linear and rotary actuators where there is a need to restrict relative movement of actuator components or to restrict actuator movement due to external forces acting on the actuator, such as to resist moving the actuator in forward and reverse directions caused by external vibrational forces. The forward and reverse directions may be linear directions in the case of a linear actuator or rotational directions in the case of a rotary actuator.

Figure 1:
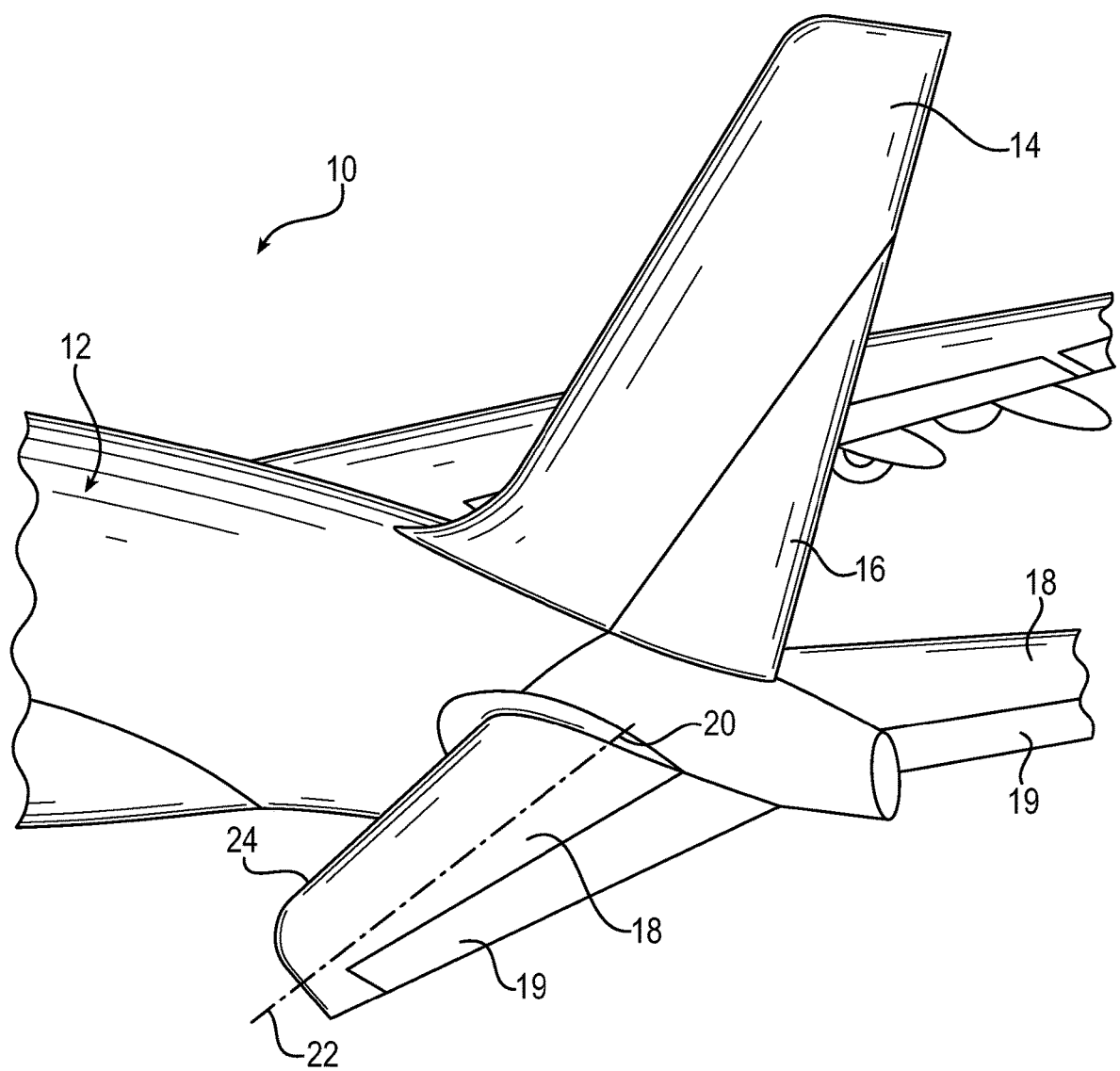
FIG. 1 is an elevational view of an aircraft that includes an actuator according to the present invention.

Referring first to FIG. 1, an exemplary aircraft 10 includes a rear fuselage 12 having a tail fin 14 which carries a rudder 16. Horizontal stabilizers 18 and elevators 19 are provided on either side of the tail fin 14. Each horizontal stabilizer 18 is pivotably mounted to the fuselage 12 at pivot point 20 whereby it can be pivoted about axis 22 to adjust the longitudinal pitch (i.e., "trim") of the aircraft 10. During flight, each horizontal stabilizer 18 is adjusted by a horizontal stabilizer trim actuator (also herein referred to as an HSTA) which moves the stabilizer's leading edge 24 in a first direction, such as upward with respect to FIG. 1 (aircraft nose down) and in a second direction, such as downward with respect to FIG. 1 (aircraft nose up). The stabilizer adjustments may be automatically controlled directly from the aircraft's flight computers (for example, an automatic flight control unit, or any automatic control unit in other applications) and/or may be manually controlled by pilot input.

Figure 2:
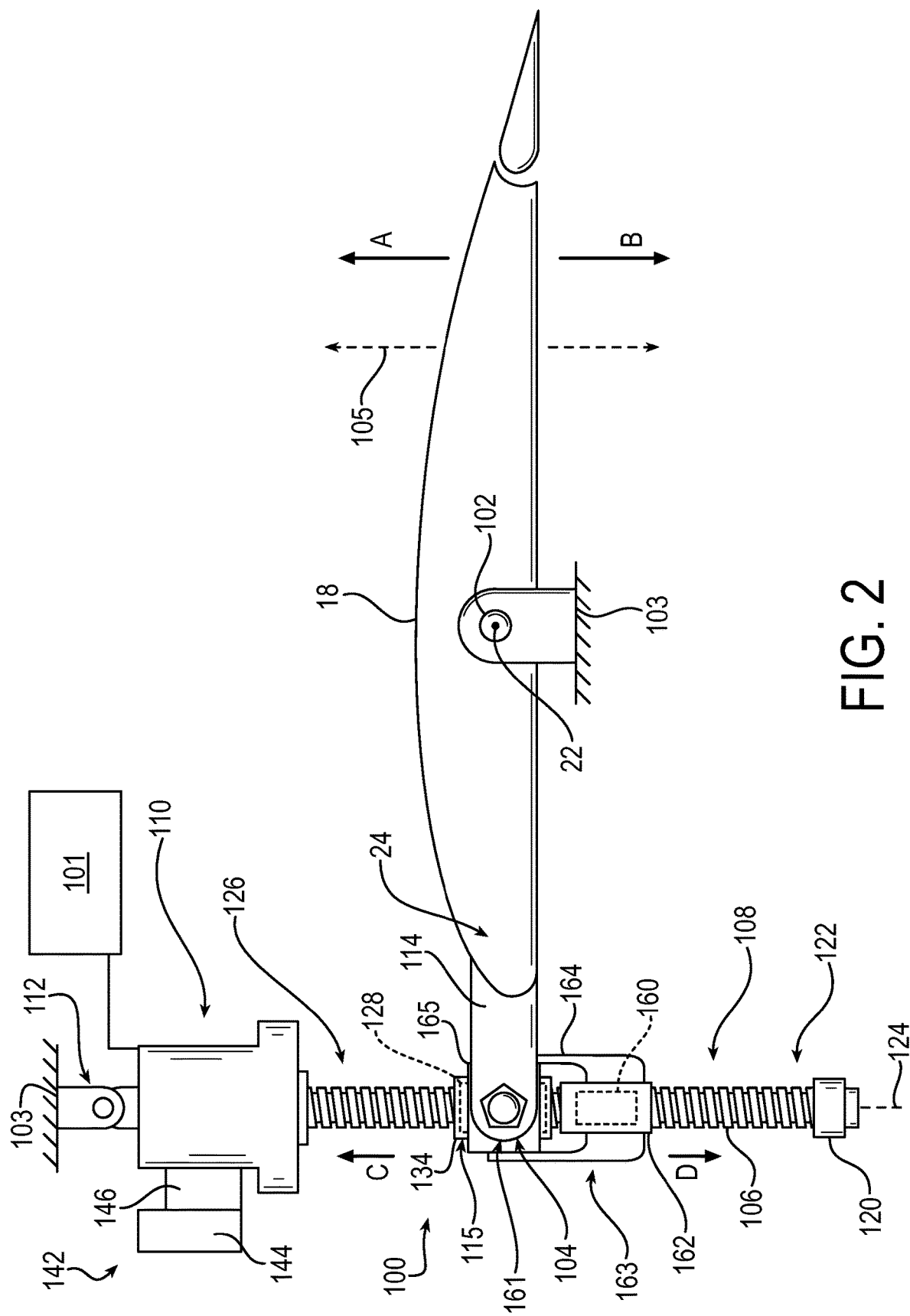
FIG. 2 is a schematic view of an actuator according to the present invention, for moving a control surface of the aircraft of FIG. 1.

Turning now to FIG. 2, an exemplary horizontal stabilizer trim actuator (HSTA) 100 according to the present invention is shown for selectively controlling the position of the horizontal stabilizer 18 (or a control surface, more generally). The actuator 100 is configured to control movement of the horizontal stabilizer, for example in response to a command from a controller 101 to move the flight control surface 18. As mentioned, the flight control surface 18 is rotatable about the pivot axis 22, in an upward first direction A or a downward second direction B. It will be appreciated that apparatuses such as an internal control unit 101 are generally well known in the art and thus known details thereof have been omitted for purposes of brevity and simplicity.

The horizontal stabilizer 18 may be pivotably connected along its length to a pivoting stabilizer gimbal structure 102, also herein referred to as a stabilizer gimbal 102. The stabilizer gimbal 102 is attached to the vertical stabilizer section or fuselage tail section 103 of the fuselage 12. The leading edge 24 of the horizontal stabilizer 18, also herein referred to as the control surface 18, may be in turn pivotably connected to an actuating drive gimbal 104 located generally midway along the actuator 100 and which in turn is pivotably connected to a rotating assembly of the actuator 100, such as a threaded nut and screw assembly, to be further discussed in detail.

Figure 3:
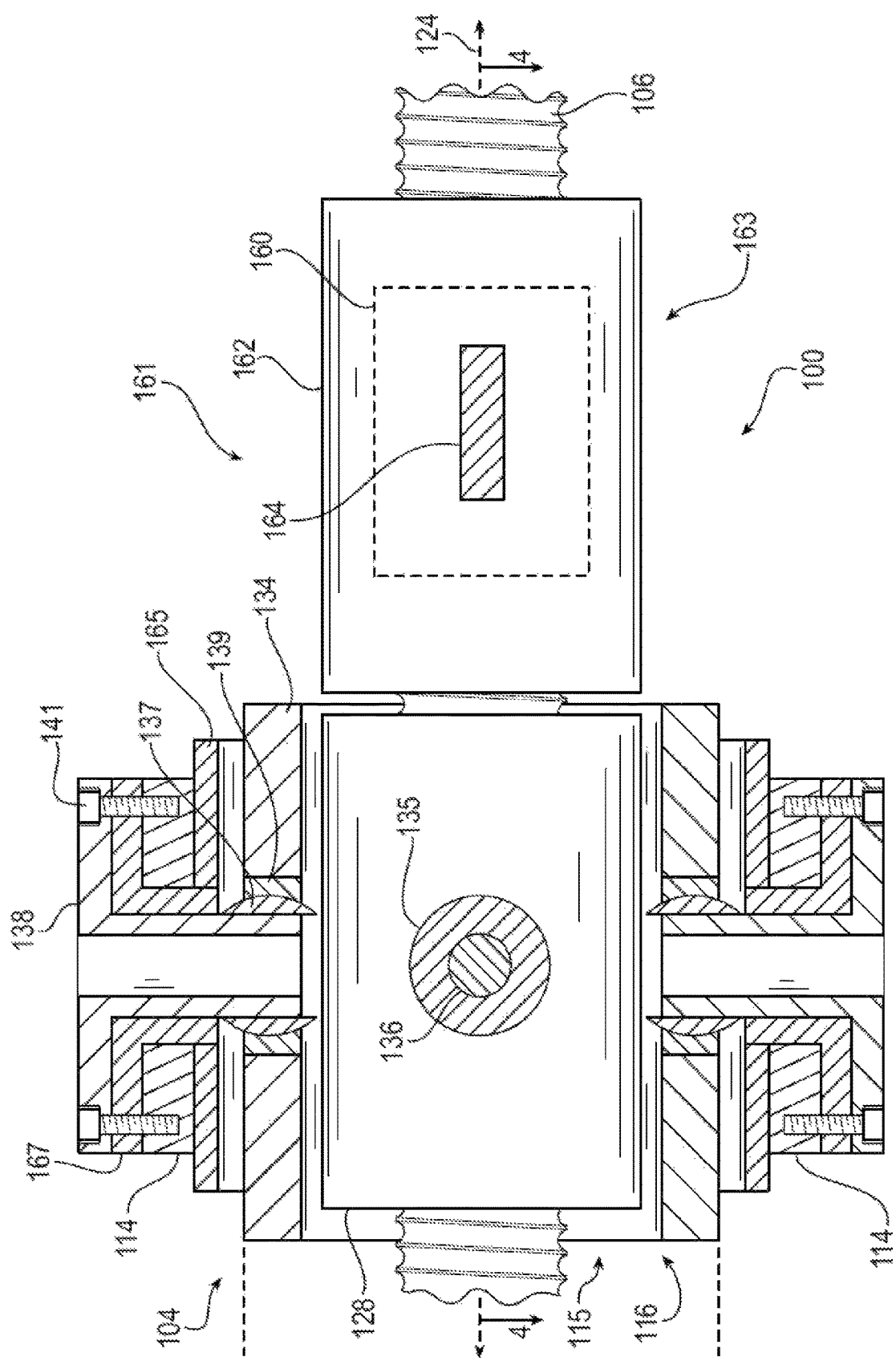
FIG. 3 is a partial elevational schematic view of the actuator as shown in FIG. 2, broken away in section.
Figure 4:
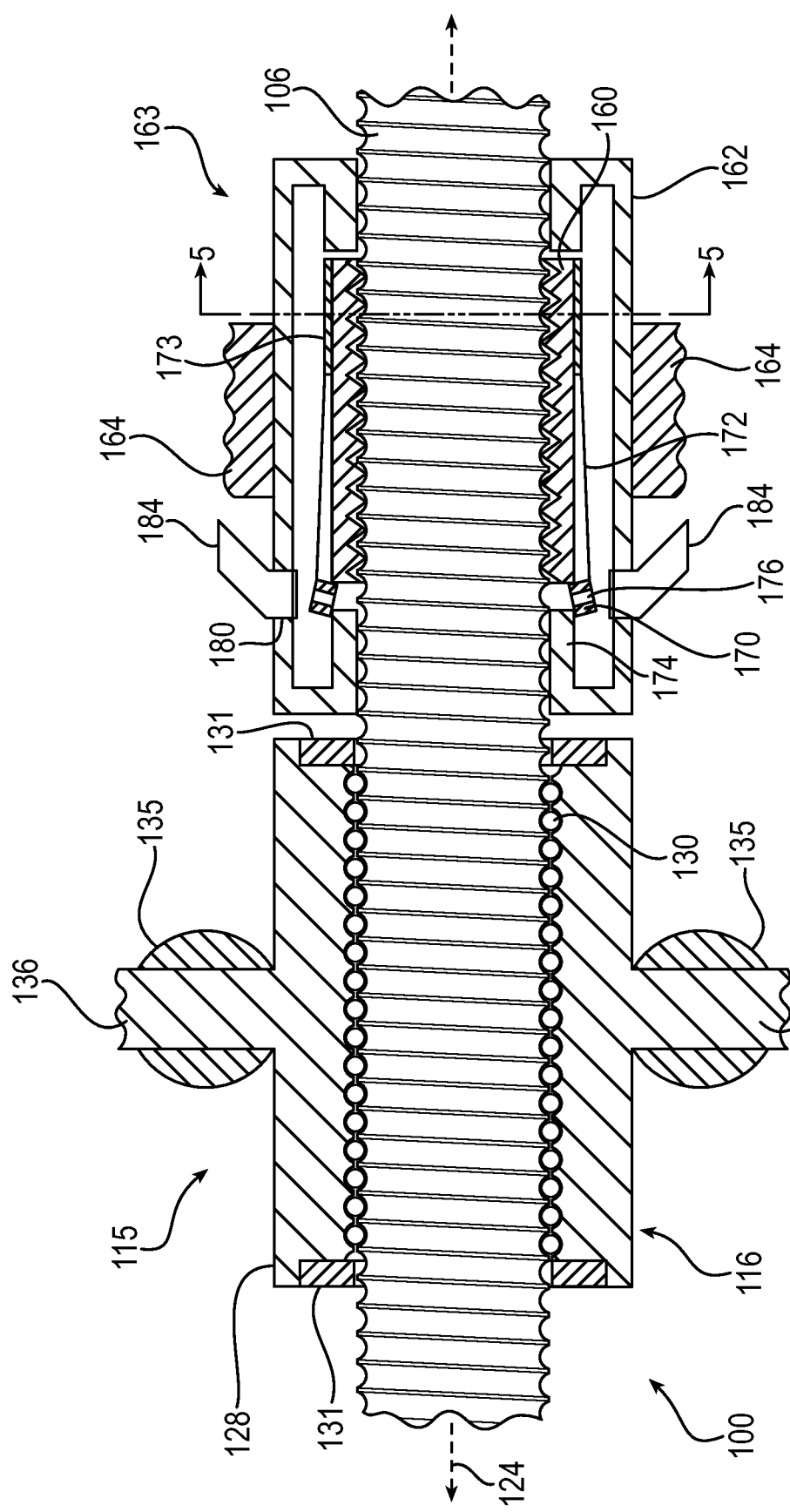
FIG. 4 is a sectioned view of the actuator as shown in FIG. 3.

Referring now to FIGS. 2-4, the illustrated actuator 100 is shown as a linear actuator that is driven to effect movement of at least a portion of the stabilizer 18 (or a driven component in other applications) along a longitudinal axis 105. The actuator 100 includes a screw 106 that extends between a moving end 108 (also herein referred to as an actuating end) of the actuator 100 and a fixed end 110 (also herein referred to as a remote end) of the actuator 100 opposite the moving end 108. The moving end 108 moves to control movement of the stabilizer 18 via coupling to the drive gimbal 104.

The fixed end 110 is coupled to a reference structure of the aircraft (such as a fuselage portion) via a support gimbal 112. Further details of connection of stabilizer actuators to the rudder section or to the fuselage tail section 103 of the fuselage 12 have been omitted for purposes of brevity and simplicity.

As used herein, coupling may refer to direct coupling between elements or indirect coupling between elements, where a third element is disposed between the coupled elements.

The moving end 108 of the illustrated actuator 100 is configured to extend and retract thereby moving a force transfer member 114. The force transfer member 114 extends from the control surface 18 and is coupled between the drive gimbal 104 and the control surface 18. The force transfer member 114 may be integral with or otherwise suitably coupled to the control surface 18. The force transfer member 114 couples a suitable location of the actuator 100, such as the drive gimbal 104, to the stabilizer 18 for allowing driving and control of the control surface/stabilizer 18 via the actuator 100.

Particularly, the primary load path of the actuator 100 is the default load path along which load is transferred between control surface 18 and the screw 106 of the actuator 100 to control, such as to restrict movement of, the control surface 18. In a default state of the actuator 100, the primary load path is in a controlling state having majority control over the control surface 18.

The primary load path is shown at 115 in FIG. 3, and extends between the screw 106 and the transfer member 114. As illustrated, the transfer member 114 extends along an axis orthogonal to a plane of the page. The primary load path includes a primary ball nut assembly 116, also herein referred to as a primary nut assembly 116, which is located generally midway along the screw 106. An extend mechanical stop 120 may be attached to a distal end 122 of the screw 106 to prevent the primary ball nut assembly 116 from being unthreaded relative to the screw 106.

The primary ball nut assembly 116 includes is a primary ball nut threaded member 128, a plurality of ball members 130 contained in the primary ball nut threaded member 128 via one or more ball plugs 131, and the actuating drive gimbal 104. It will be appreciated that the depicted screw 106 is a ball screw 106 having threads for receiving the plurality of ball members 130.

Alternatively, it will be appreciated that in some embodiments the screw 106 may not be a ball screw and may instead have alternative threading, and that a non-ball nut may be utilized in place of the primary ball nut assembly 116. For example, the principles of the invention are also applicable to an actuator having a drive screw, a lead screw, or a roller screw, or to an actuator having a translating screw and a rotating nut. For example, in some embodiments, the nut may be rotated by the motor to effect translation of a screw.

The screw 106 is driven to effect movement of the control surface 18 via effecting translational movement of the primary ball nut assembly 116 along the screw 106. Translation of primary ball nut assembly 116 is along a longitudinal axis 124 of the ball screw 106. The translation is effected by rotation of the ball screw 106 about the same axis 124. Via the rotation of the ball screw 106, the primary ball nut assembly 116 and the force transfer member 114 are movable in an upward third direction C (corresponding to movement of the stabilizer 18 in the downward second direction B) and an opposite downward fourth direction D (corresponding to movement of the stabilizer 18 in the upward first direction A).

As used herein, the upward and downward directions refer to one alignment of the HSTA 100 in the fuselage of an aircraft, where in level flight or landed on a ground surface, an HSTA is often aligned vertically with respect to the ground surface. Thus, a downward/distal end of the HSTA is located nearer the ground than the opposite upward/proximal end of the HSTA. In other words, in such orientation, upward is meant to refer to a direction towards a proximal end 126 of the screw 106 adjacent the support gimbal 112. Downward is meant to refer to a direction towards the distal end 122 of the screw 106 adjacent the extend mechanical stop 120. The terms are not meant to be limiting, but refer to opposing directions along the longitudinal axis 124, which could be otherwise aligned, for example relative to the ground, fuselage, or control/control surface 18. In another embodiment, the HSTA 100 could be reversed 180 degrees.

The illustrated primary ball nut threaded member 128, also herein referred to as the primary nut threaded member 128, is coupled to the force transfer member 114/control surface 18 via the drive gimbal 104. The drive gimbal 104 includes a primary nut housing 134 disposed about the primary nut threaded member 128, primary nut trunnions 136 gimballing the primary nut threaded member 128 to the primary nut housing 134, and primary nut housing trunnions 138 gimballing the primary nut housing 134 to the force transfer member 114.

Two primary nut trunnions 136 are disposed opposite one another about the primary nut threaded member 128. The primary nut trunnions 136 are shown as integral with the primary nut threaded member 128, though may be a separate component coupled to the primary nut threaded member 128 in any suitable manner in other embodiments. A ball member 135 is coupled to each of the primary nut trunnions 136 and is received in a channeled member (not shown) coupled to the primary nut housing 134.

Two primary nut housing trunnions 138 are disposed opposite one another about the primary nut housing 134. The primary nut housing trunnions 138 are shown as separate from but coupled to the primary nut housing 134. A ball member 137 is coupled to each of the primary nut housing trunnions 138 and is received in a channeled member 139 coupled to the primary nut housing 134. The primary nut housing trunnions 138 are also coupled to the transfer member 114, such as via one or more fasteners 141.

It will be appreciated that the illustration of FIG. 3 shows only one manner and location of fastening. Additional or alternative manners and/or locations could be used where suitable.

The primary nut threaded member 128 is anti-rotated relative to the screw 106 via its connection to the primary nut housing 134 (primary nut trunnions 136, ball members 135 and associated channeled members), and subsequently via the connection of the primary nut housing 134 to the force transfer member 114 (primary nut housing trunnions 138, ball members 137 and associated channeled members 139).

It will be appreciated that in some embodiments, the primary nut housing 134 and primary nut housing trunnions 138 may be omitted, and the primary nut trunnions 136 may be gimballed to the transfer member 114. It will also be appreciated that although the primary nut housing 134 is shown disposed fully circumferentially about the primary nut threaded member 128 in FIG. 3, the primary nut housing 134 may be not fully disposed about the primary nut threaded member 128 in some embodiments.

The corresponding movements of the primary ball nut threaded member 128 and the ball screw 106 are effected by a drive unit 142. The drive unit 142 is disposed at the fixed end 110 of the actuator 100 and includes for example, a hydraulic or electric drive motor 144 and a gearbox assembly 146. The drive motor 144 is provided for rotatably driving the screw 106 to effect the translation of the primary nut threaded member 128 and subsequent movement of the control surface 18. The drive unit 142 and further details thereof are of a construction well known in the art and thus it is only generally shown and described for purposes of simplicity and brevity.

It will be appreciated that the drive motor 144 need not be an electric motor. The drive unit 142 could additionally or alternatively comprise hydraulic and/or pneumatic cylinders, or any other device which can effect movement of the primary nut threaded member 128 and the control surface 18.

Referring next to FIGS. 2-5, a secondary nut 160 is also coupled to the ball screw 106, and, along with a secondary drive gimbal 161, forms a secondary load path 163. The secondary load path 163, like the primary load path 115, extends between the drive screw 106 and the force transfer member 114. In the case of failure of the primary load path 115, the secondary load path 163 is configured to provide a majority of control of the control surface 18 via a transfer of force from the drive unit 142, along the secondary load path 163.

As indicated, the secondary load path 163 includes the secondary nut 160, and also includes the secondary drive gimbal 161. The secondary drive gimbal 161 includes a secondary nut housing 162 gimballed to a secondary gimbal sleeve 165 by one or more secondary nut housing carriage members 164, and secondary nut trunnions 167 gimballing the secondary gimbal sleeve 165 to the force transfer member 114.

Two secondary nut trunnions 167 are disposed opposite one another about the secondary gimbal sleeve 165. The secondary nut trunnions 167 are shown as separate from but coupled to the secondary gimbal sleeve 165. The secondary nut trunnions 167 are also coupled to the force transfer member, 114 such as via the fasteners 141.

It will be appreciated that in some embodiments, different fasteners may be used to couple the secondary nut trunnions 167 to the force transfer member 114 than are used to couple the primary nut housing trunnions 138 to the force transfer member 114. Further, it will be appreciated that the illustration of FIG. 3 shows only one manner and location of fastening. Additional or alternative manners and/or locations could be used where suitable.

The secondary gimbal sleeve 165 extends fully circumferentially about and is radially outwardly spaced from the primary nut housing 134. Two opposing secondary nut housing carriage members 164 gimbal the secondary gimbal sleeve 165 to the secondary nut housing 162. The carriage members 164 are shown as integral with the secondary nut housing 162, though they may be separate and coupled to the secondary nut housing 162 in other embodiments.

The secondary nut housing 162 is disposed circumferentially, such as fully circumferentially, about the secondary nut 160. In other embodiments, the secondary nut housing 162 may extend less than fully circumferentially about the secondary nut 160 where suitable.

In the default operative state of the HSTA 100, the secondary drive gimbal 161 is fixed relative to the primary ball nut assembly 116. In such default state, the secondary nut housing 162 and secondary gimbal sleeve 165 are caused to translate with the primary ball nut assembly 116 along the screw 106 via force applied to the primary nut threaded member 128 from the threads of the screw 106.

The secondary nut 160, like the primary nut threaded member 128, is threadedly engaged with the screw 106. As depicted, the secondary nut 160 includes at least one thread for engaging the screw 106 and lacks ball members. The secondary nut 160 may have inverse threading or other suitable threading for engaging corresponding threads of the ball screw 106.

Figure 5:
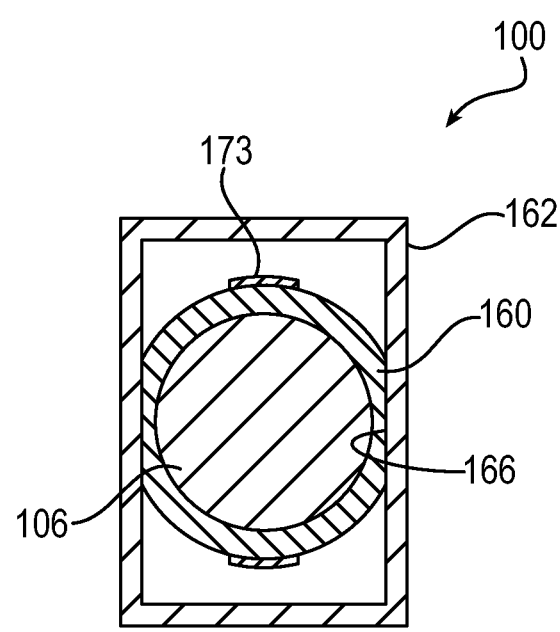
FIG. 5 is a sectioned view of the actuator as shown in FIG. 4.

Referring briefly to FIG. 5, the secondary nut 160 is anti-rotated relative to the screw 106 such that that secondary nut 160 is caused to translate along the screw 106 upon rotation of the screw 106 about the longitudinal axis 124. Engagement of the secondary nut 160 with the secondary nut housing 162 provides for this anti-rotation. Particularly, the outer circumference of the secondary nut 160 is shaped, such as having flats 166, for engaging corresponding features on the secondary nut housing 162.

As depicted, two oppositely disposed flats 166 are provided on the outer circumference of the secondary nut 160 for engaging with and preventing rotation of the secondary nut 160 relative to the secondary nut housing 162. One or more flats 166 may be included in other embodiments, and the flats 166 may be otherwise suitably circumferentially separated from one another about the secondary nut 160.

Referring again to FIGS. 2-5, the secondary nut 160 and the secondary load path 163 does not provide majority control of the force transfer member 114 and the control surface 18 during default operative functioning of the primary load path 115. This is because the primary load path 115 in the default operative state, also herein referred to as the default controlling state, transfers a greater load between the screw 106 and the control surface 18 than the secondary load path 163. Thus in its default operative state, the primary load path 115 has majority control.

In the default operative state of the primary load path 115, the secondary load path 163 is in a default non-controlling state in which the secondary load path 163 has less than majority control of the control surface 18. In the default non-controlling state of the secondary load path 163, the secondary nut 160 is caused to translate in the same direction that the primary nut threaded member 128 translates in response to rotation of the screw 106.

The secondary nut 160 is axially-spaced at opposed axial ends of the secondary nut 160 from the secondary nut housing 162 in this default non-controlling state of the secondary load path 163. In this way, axial force is not directly axially-transferred between the secondary nut 160 and the secondary nut housing 162. Further, the secondary nut 160 is defaultly axially-positioned a predetermined distance from the primary nut threaded member 128, and thus from the primary ball nut assembly 116, via the default axial alignment of the secondary nut 160 along the screw 106. It will be appreciated that the predetermined distance may be a single distance or a range.

The secondary nut 160 is configured to transfer a lesser force than the primary ball nut assembly 116 from the screw 106 to the control surface 18, until a failure of the primary load path 115 effects relative axial movement of the primary ball nut assembly 116 and the secondary nut 160 relative to one another and a distance between the primary ball nut assembly 116 and the secondary nut 160 exceeds a predetermined amount.

In the case of a failure of the primary load path 115 (failure of the primary ball nut assembly 116), and transition of the primary load path 115 from its default controlling state to a failure state having less than majority control of the control surface 18, a change of the secondary load path 163 is effected. In such case, the secondary load path 163 is transitioned from its default non-controlling state to a secondary controlling state taking majority control of the control surface 18 from the primary ball nut assembly 116 and the primary load path 115. The secondary load path 163 then transfers a greater load between the screw 106 and the control surface 18 than the primary load path 115.

The secondary load path 163 is configured to take this majority control upon numerous failure modes of the primary load path 115. One failure of the primary load 115 path may be caused by a fracturing or shearing off of a connecting trunnion segment 136 or 138 of the primary ball nut assembly 116. In such case, the force transfer member 114 will no longer be controlled by the primary threaded member 128. The primary nut housing 134, the force transfer member 114, the secondary gimbal sleeve 165 and the secondary nut housing 162 may move relative to the secondary nut 160. Another failure of the primary load path 115 may be the fracturing or loss of one or more ball members 135 or 137, causing similar relative movement.

Yet another failure of the primary load path 115 may be the loss of nut ball members 130 from the primary nut threaded member 128, such as due to loss or breaking of a ball plug 131. In such case, the primary nut threaded member 128, the primary nut housing 134, the force transfer member 114, the secondary gimbal sleeve 165 and the secondary nut housing 162 may move relative to the secondary nut 160.

Figure 6:
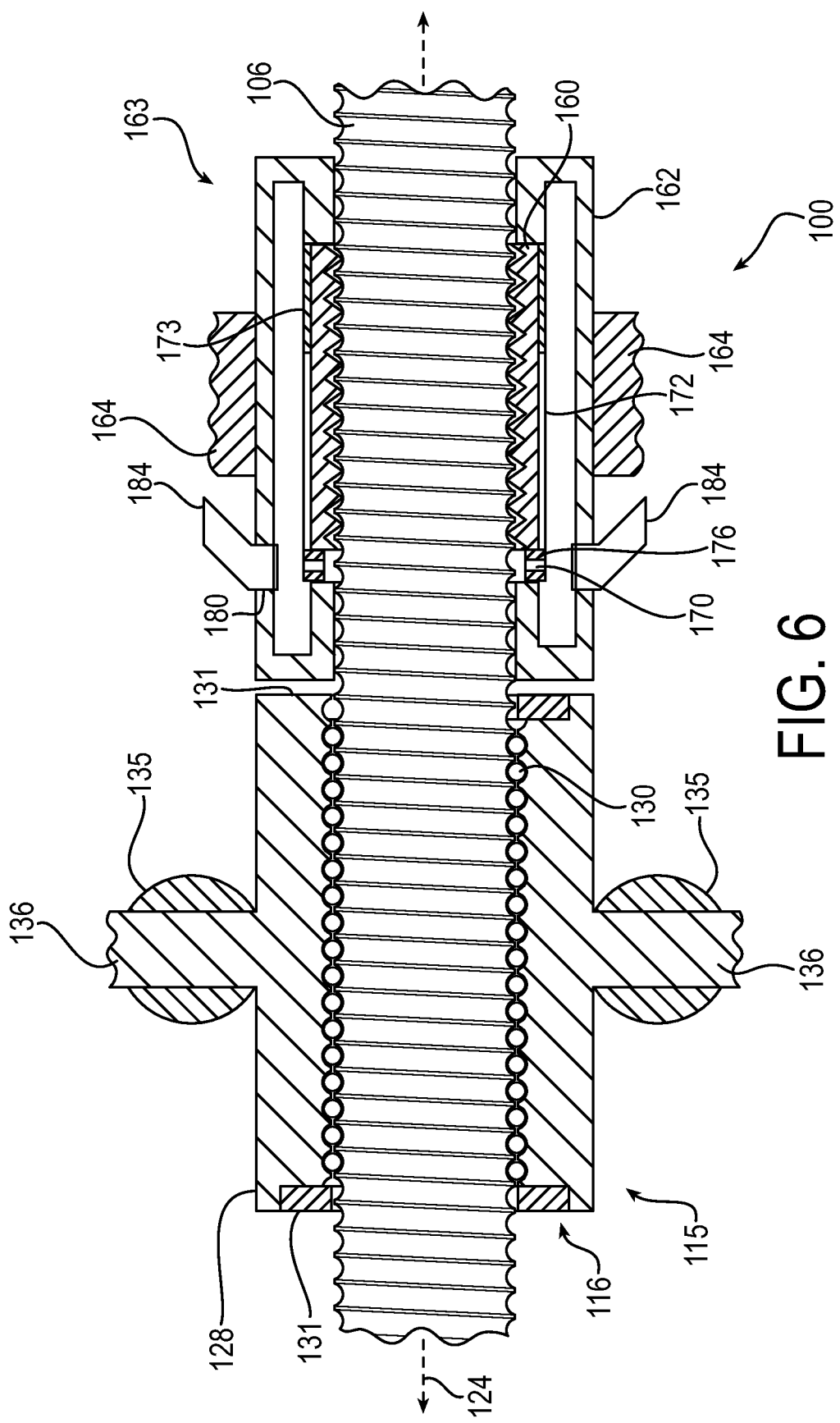
FIG. 6 is a partial elevational schematic view of the actuator as shown in FIG. 2, broken away in section, and shown with the moving end of the actuator in a partial failure state.

For example, turning to FIG. 6, a failure mode of the primary load path 115 is depicted such as where one or more ball members 135 or 137 has been damaged or where one or more trunnion segments 136 or 138 have been damaged. The primary nut housing 134, the force transfer member 114, the secondary gimbal sleeve 165 and the secondary nut housing 162 were thus enabled to freely shift along the screw 106 relative to the threadedly engaged secondary nut 160. Upon this free shifting of one or more components of the primary ball nut assembly 116 relative to the secondary nut 160, in this case towards the remote end 110 of the HSTA 100, the secondary nut 160 is restricted.

Particularly, an engagement member 170 is configured to be moved to a position axially aligned between the primary ball nut assembly 116 and the secondary nut 160, and more specifically between the secondary nut 160 and the secondary nut housing 162, to allow for the secondary load path 163 to take majority control of the control surface 18 from the failed primary load path 115. The engagement member 170 is configured to be moved when relative axial movement of one or more components of the primary ball nut assembly 116 and the secondary nut 160 exceeds a predetermined amount allowing the engagement member 170 to move from a default ambush position (FIG. 4) to a biased engaged position (FIG. 6).

Turning now to specifics of the engagement member 170, the engagement member 170 is coupled to the secondary nut 160 for being carried for axial translation therewith. Opposing engagement members 170 are shown, though any suitable number, one or more, of engagement members 170 may be included, and/or the engagement members 170 may be otherwise circumferentially arranged about the secondary nut 160 in other embodiments.

The HST actuator 100, and particularly the secondary load path 163, includes a biasing member 172, such as a leaf spring, that is coupled between the engagement member 170 and the secondary nut 160, such as via a coupling portion 173 coupled to the secondary nut 160. The biasing member 172 biases the engagement member 170 radially inwardly towards the longitudinal axis 124, into the biased engaged position (FIG. 6) in axial alignment between the secondary nut 160 and the secondary nut housing 162.

The engagement member 172 is maintained in the ambush position (FIG. 4), spaced from the engaged position (FIG. 6), such as radially outwardly from the engaged position. The ambush position (FIG. 4) is maintained against the bias of the biasing member 172 by one or both of the primary load path 115 and the secondary nut 160, and more particularly by relative positioning of, such as axial alignment of, the secondary nut 160 relative to the components of the primary load path 115.

As depicted in FIG. 4, when relative axial movement of the primary load path 115 and the secondary nut 160 has not exceeded a predetermined amount (when the primary load path 115 is in the default operative controlling state and the secondary load path 163 is in the corresponding default non-controlling state) the engagement member 172 is disposed in engagement with an axially, inwardly-projecting shelf 174 of the secondary nut housing 162. On the other hand, when the shelf 174 is caused to move relative to the secondary nut 160, such as away from secondary nut 160 (in the direction C of FIG. 2), the engagement member 170 is able to move off of the shelf 174 and to its biased engaged position.

As depicted in FIG. 6, the primary nut housing 134 has at least partially uncoupled from the primary nut threaded member 128, enabling the force transfer member 114 and the secondary nut housing 162 coupled thereto to freely shift toward the remote end 110 of the HSTA 100. It follows that when the engagement member 170 is in the engaged position, load may be transferred from the screw 106 to the secondary nut 160, and then to the secondary nut housing 162 and the force transfer member 114. Thus movement of the engagement member 170 to the biased engaged position enables the secondary load path 163 to transition to its secondary controlling state.

It will be appreciated that in some embodiments, the secondary nut housing 162 and the engagement member 170 may be constructed such that the engagement member 170 is biased in the non-axially-engaged position. In such case, a projection, such as a shelf 174, of the secondary nut housing 162 may move or cam the engagement member 170 into the axially-engaged position restricting relative movement of the secondary nut 160 and the primary load path 115.

Still referring to FIG. 6, it is noted that the engagement members 170 each include an orifice 176 extending partially through the respective engagement member 170, or as depicted, fully through the engagement member 170. This feature may be provided to enable a suitable tool to be inserted into the engagement member 170 to allow for removal from the biased engaged position of the engagement member 170 that is shown in FIG. 6. The engagement members 170 may be accessed through one or more passages 180 in the secondary nut housing 162 that are aligned with the engaged positions of the engagement members 170.

As shown, sensors 184 occupy the one or more passages 180 and are coupled to the secondary nut housing 162 in the passages 180. The sensors 184 may be removed to obtain access to the respective orifices 176 of the engagement members 170. Via coupling to the secondary nut housing 162, the sensors 184 are carried for common axial movement with the secondary nut housing 162 and with the force transfer member 114. In the default controlling state of the primary load path 115, the sensors 184 are also carried for common movement with the primary load path. The sensors 184 are fixed relative to the secondary nut 160 upon transition of the engagement members 170 to the engaged position.

The linear HST actuator 100 includes one or more sensors 184 for sensing movement of the one or more engagement members 170 from the ambush position to the engaged position. The depicted sensors 184 are configured to sense the movement of the engagement members 170. The movement signifies failure of the primary ball nut assembly 116 of the primary load path 115, the transition of the primary load path 115 from the default operative state to the failure state, and the transition of the secondary load path 163 from the default non-controlling state to the secondary controlling state.

The sensors 184 may be any suitable type of sensors such as binary position sensors for sensing a near condition and a far condition of the respective engagement members 170. Two sensors 184 are depicted disposed opposite one another and aligned at the location of the engaged positions of the two engagement members 170. Where lesser or more engagement members 170 are used in other embodiments, a corresponding number of sensors 184 may be included.

Figure 7:
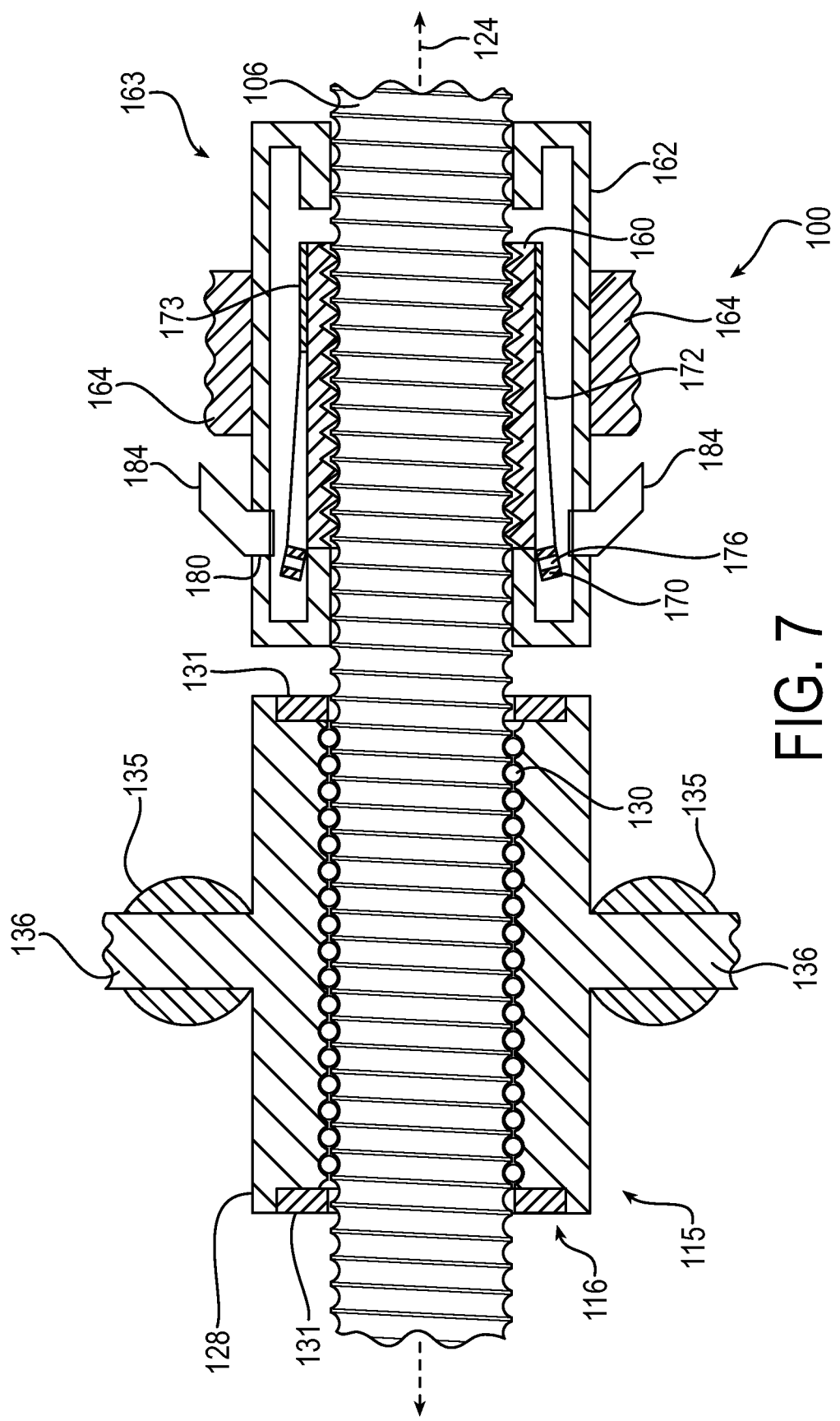
FIG. 7 is a partial elevational schematic view of the actuator as shown in FIG. 2, broken away in section, and shown with the moving end of the actuator in another partial failure state.

Turning now to FIG. 7, a second example of a failure mode of the primary load path 115 is depicted, also such as where one or more ball members 135 or 137 has been damaged or where one or more trunnion segments 136 or 138 have been damaged. The primary nut housing 134, the force transfer member 114, the secondary gimbal sleeve 165 and the secondary nut housing 162 were thus enabled to freely shift along the screw 106 relative to the threadedly engaged secondary nut 160. Different from the depiction and failure mode of FIG. 6, the free shifting of one or more components of the primary ball nut assembly 116 relative to the secondary nut 160 is in a direction towards the distal end 122 of the HSTA 100.

In this direction, the secondary load path 163 will hold load but has not yet transitioned to its secondary controlling state. Rather, because a failure of the primary load path has caused the primary nut housing 134, the secondary gimbal sleeve 165 and the secondary nut housing 162 to move in the direction D of FIG. 2, the engagement members 170 are maintained on the shelves 174.

It will be appreciated that due to the failure of the primary load path 115, external force on the control surface 18, such as air pressure in the case of an aircraft, can cause the primary ball nut assembly 116 to freely shift oppositely in the direction C of FIG. 2, and thus effect transition of the secondary load path 163 into the state shown in FIG. 6, where the engagement member 170 is moved to the biased engaged state and the secondary load path 163 is transitioned to the secondary controlling state.

It will also be appreciated that the HSTA 100 in other embodiments may include one or more additional engagement members 170 disposed axially opposite the depicted engagement members 170 along the longitudinal axis 124, at an axially opposite side of the secondary nut 160. In this manner, the secondary load path 163 may transition to the secondary controlling state in response to movement of the failed primary ball nut assembly 116 and primary load path 115 that effects free shifting of the force transfer member 114 in either axial direction C or D of FIG. 2.

In summary, a linear actuator 100, for controlling movement of a control surface 18 of an aircraft 10, includes a screw 106, a primary load path 115 and secondary nut 160 engaged with the screw 106, and an engagement member 170. The engagement member 170 moves from an ambush position, maintained by the primary load path 115 or the secondary nut 160, to an engaged position, restricting relative movement between the primary load path 115 and the secondary nut 160. The restricted relative movement may occur in response to free relative axial movement of the primary load path 115 and the secondary nut 160 caused by a failure of the primary load path 115 of the linear actuator 100. A sensor 184 of the linear actuator 100 is configured to sense the failure of the primary load path 115 and the free relative axial movement of the primary load path 115 and the secondary nut 160.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A linear actuator for controlling movement of an external surface, the linear actuator comprising:
   a screw;
   a primary load path engaged between the screw and the external surface, the primary load path having a primary nut engaged with the screw;
   a secondary nut assembly having a secondary nut engageable with the screw;
   an engagement member that is maintained by the secondary nut assembly in an ambush position until relative axial movement of the primary nut and at least a portion of the secondary nut assembly exceeds a predetermined amount, after which the engagement member is free to move radially from the ambush position to an engaged position; and
   a sensor for sensing radial movement of the engagement member from the ambush position to the engaged position;
   wherein the linear actuator is configured such that when the engagement member is in the engaged position, the engagement member does not lockingly engage the screw to prevent rotation of the screw.

2. The linear actuator of claim 1, wherein the engagement member is carried by the secondary nut for axial common movement therewith.

3. The linear actuator of claim 1, wherein the linear actuator includes a biasing member that biases the engagement member radially towards the engaged position.

4. The linear actuator of claim 3, wherein the biasing member extends between the engagement member and the secondary nut.

5. The linear actuator of claim 1,
   wherein the secondary nut assembly further includes a secondary nut housing at least partially disposed about the secondary nut,
   wherein the predetermined amount of relative axial movement between the primary nut and at least a portion of the secondary nut assembly is a predetermined amount of relative axial movement between the secondary nut housing and the primary nut, and wherein the linear actuator is configured such that the engagement member is maintained by the secondary nut housing in the ambush position until the predetermined amount of relative axial movement between the secondary nut housing and the primary nut is exceeded, after which the engagement member is free to move radially from the ambush position to the engaged position.

6. The linear actuator of claim 1, wherein the engagement member is biased radially inwardly towards a central rotational axis of the screw to the engaged position.

7. The linear actuator of claim 5, wherein the sensor is carried by the secondary nut housing for common axial movement with the primary nut during a default operative state of the linear actuator.

8. The linear actuator of claim 7,
   wherein, when the linear actuator transitions from the default operative state to a failure state, (i) the relative axial movement of the secondary nut housing and the primary nut exceeds the predetermined amount, (ii) the secondary nut housing moves axially relative to the secondary nut to provide a gap therebetween, (iii) the engagement member moves radially into the gap to the engaged position, and (iv) in the engaged position the engagement member effects common axial movement of the secondary nut and the secondary nut housing relative to each other; and
   wherein the sensor is fixed relative to the secondary nut upon movement of the engagement member to the engaged position.

9. The linear actuator of claim 1, further in combination with an aircraft having the external surface, wherein the secondary nut is coupled to the external surface for controlling the external surface when the engagement member is in the engaged position.

10. A linear actuator for controlling a control surface, the linear actuator comprising:
    a screw;
    a primary load path extendable between the screw and the control surface; and
    a secondary load path extendable between the screw and the control surface, wherein the secondary load path transitions from a default non-controlling state having less than majority control of the control surface to a secondary controlling state to take majority control of the control surface in response to the primary load path transitioning from a default operative state having majority control of the control surface to a failure state having less then majority control of the control surface;
    wherein the secondary load path includes a secondary nut assembly having a secondary nut threadedly engageable with the screw and a secondary nut housing at least partially housing the secondary nut, and the primary load path includes primary nut threadedly engaged to the screw, and wherein the secondary nut assembly is configured to transfer a lesser force from the screw to the control surface than the primary nut until the primary load path is transitioned to the failure state;
    wherein the secondary load path is maintained in the non-controlling state until relative axial movement of the primary nut and the secondary nut housing exceeds a predetermined amount;
    wherein the linear actuator further includes an engagement member coupled to the secondary nut for translation with the secondary nut, the engagement member is configured to move radially from a default disengaged position to a biased engaged position in response to the primary load path transitioning to the failure state, and the movement of the engagement member to the biased engaged position enables the secondary load path to transition to the secondary controlling state;
    wherein a sensor is provided to sense radial movement of the engagement member from the default disengaged position to the biased engaged position; and
    wherein, when the engagement member is in the biased engaged position, the engagement member does not lockingly engage the screw to prevent rotation of the screw.

11. The linear actuator of claim 10, wherein the primary load path transfers a greater load between the screw and the control surface than the secondary load path when the primary load path is in the default operative state, and wherein the secondary load path transfers a greater load between the screw and the control surface than the primary load path when the secondary load path is in the secondary controlling state.

12. The linear actuator of claim 10, further in combination with an aircraft having the control surface, wherein the primary load path provides majority control of the control surface when the secondary load path is in the default non-controlling state.

13. The linear actuator of claim 4, wherein the biasing member is a leaf spring having one end attached to the secondary nut and an opposite end attached to the engagement member.

14. The linear actuator of claim 1, further including a housing in which the secondary nut is disposed, and the sensor is coupled to the housing.

15. The linear actuator of claim 14, wherein the sensor is removable from the housing to provide an orifice through which the engagement member is accessible.

16. A linear actuator for controlling movement of an external surface, the linear actuator comprising:
　a screw;
　a primary load path engaged between the screw and the external surface, the primary load path having a primary nut engaged with the screw;
　a secondary nut assembly having a secondary nut engageable with the screw;
　an engagement member that is maintained by the secondary nut assembly in an ambush position until relative axial movement of the primary nut and at least a portion of the secondary nut assembly exceeds a predetermined amount, after which the engagement member is free to move radially from the ambush position to an engaged position; and
　a sensor for sensing radial movement of the engagement member from the ambush position to the engaged position;
　the linear actuator further including a housing in which the secondary nut is disposed, and the sensor is coupled to the housing;
　wherein the sensor is removable from the housing to provide an orifice through which the engagement member is accessible; and
　wherein the engagement member has an orifice into which a tool is insertable for moving the engagement member from the engaged position to the ambush position when the sensor is removed.

17. The linear actuator of claim 1, wherein the sensor is a binary position sensor for sensing a near condition and a far condition of the engagement member.

18. The linear actuator of claim 16, wherein, when the engagement member is in the engaged position, the engagement member does not lockingly engage the screw to prevent rotation of the screw.

19. A linear actuator for controlling movement of an external surface, the linear actuator comprising:
　a screw;
　a primary load path engaged between the screw and the external surface, the primary load path having a primary nut engaged with the screw;
　a secondary nut assembly having a secondary nut engageable with the screw and a secondary nut housing at least partially disposed about the secondary nut;
　an engagement member that is maintained by the secondary nut housing in an ambush position until relative axial movement between the secondary nut housing and the primary nut exceeds a predetermined amount, after which the engagement member is free to move radially from the ambush position to an engaged position; and
　a sensor for sensing radial movement of the engagement member from the ambush position to the engaged position;
　wherein, when the relative axial movement between the secondary nut housing and the primary nut exceeds the predetermined amount, the secondary nut housing moves axially relative to the secondary nut to provide a gap therebetween, and the engagement member moves radially into the gap to the engaged position, whereby the sensor senses the radial movement of the engagement member to the engaged position.

20. The linear actuator of claim 1, wherein the secondary nut has inverse threading for engaging the screw.

* * * * *